(12) United States Patent
Lin et al.

(10) Patent No.: US 10,216,766 B2
(45) Date of Patent: Feb. 26, 2019

(54) LARGE-SCALE IMAGE TAGGING USING IMAGE-TO-TOPIC EMBEDDING

(71) Applicant: ADOBE SYSTEMS INCORPORATED, San Jose, CA (US)

(72) Inventors: Zhe Lin, Fremont, CA (US); Xiaohui Shen, San Jose, CA (US); Jianming Zhang, Campbell, CA (US); Hailin Jin, San Jose, CA (US); Yingwei Li, La Jolla, CA (US)

(73) Assignee: ADOBE INC., San Jose, CA (US)

( * ) Notice: Subject to any disclaimer, the term of this patent is extended or adjusted under 35 U.S.C. 154(b) by 87 days.

(21) Appl. No.: 15/463,769

(22) Filed: Mar. 20, 2017

(65) Prior Publication Data

US 2018/0267997 A1    Sep. 20, 2018

(51) Int. Cl.
*G06K 9/00* (2006.01)
*G06F 17/30* (2006.01)
(Continued)

(52) U.S. Cl.
CPC .. *G06F 17/30268* (2013.01); *G06F 17/30277* (2013.01); *G06F 17/30864* (2013.01); *G06K 9/66* (2013.01); *G06N 3/04* (2013.01); *G06N 3/08* (2013.01); *G06T 7/33* (2017.01); *G06T 11/60* (2013.01); *G06T 2207/10016* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

| 9,672,279 B1* | 6/2017 | Cohen | G06F 17/30713 |
| 2010/0088295 A1* | 4/2010 | Duan | G06F 17/30253 |
| | | | 707/705 |

(Continued)

OTHER PUBLICATIONS

Apostol (Paul) Natsev, Alexander Haubold, Jelena Tešić, Lexing Xie, and Rong Yan. 2007. Semantic concept-based query expansion and re-ranking for multimedia retrieval. In Proceedings of the 15th ACM international conference on Multimedia (MM '07) . ACM, New York, NY, USA, 991-1000. (Year: 2007).*

*Primary Examiner* — Hadi Akhavannik
(74) *Attorney, Agent, or Firm* — Shook, Hardy & Bacon, L.L.P.

(57) ABSTRACT

A framework is provided for associating images with topics utilizing embedding learning. The framework is trained utilizing images, each having multiple visual characteristics and multiple keyword tags associated therewith. Visual features are computed from the visual characteristics utilizing a convolutional neural network and an image feature vector is generated therefrom. The keyword tags are utilized to generate a weighted word vector (or "soft topic feature vector") for each image by calculating a weighted average of word vector representations that represent the keyword tags associated with the image. The image feature vector and the soft topic feature vector are aligned in a common embedding space and a relevancy score is computed for each of the keyword tags. Once trained, the framework can automatically tag images and a text-based search engine can rank image relevance with respect to queried keywords based upon predicted relevancy scores.

17 Claims, 8 Drawing Sheets

(51) Int. Cl.
  *G06T 7/33*   (2017.01)
  *G06K 9/66*   (2006.01)
  *G06N 3/04*   (2006.01)
  *G06N 3/08*   (2006.01)
  *G06T 11/60*  (2006.01)

(56) References Cited

U.S. PATENT DOCUMENTS

| | | | |
|---|---|---|---|
| 2012/0102033 A1* | 4/2012 | Sarshar | G06F 17/30784 707/737 |
| 2012/0269436 A1* | 10/2012 | Mensink | G06K 9/00624 382/180 |
| 2013/0080426 A1* | 3/2013 | Chen | G06F 17/30247 707/723 |
| 2014/0267301 A1* | 9/2014 | Yang | G09G 5/24 345/467 |
| 2016/0196350 A1* | 7/2016 | Mau | G06F 17/30256 707/706 |
| 2016/0378847 A1* | 12/2016 | Byrnes | G06F 17/30598 707/739 |

* cited by examiner

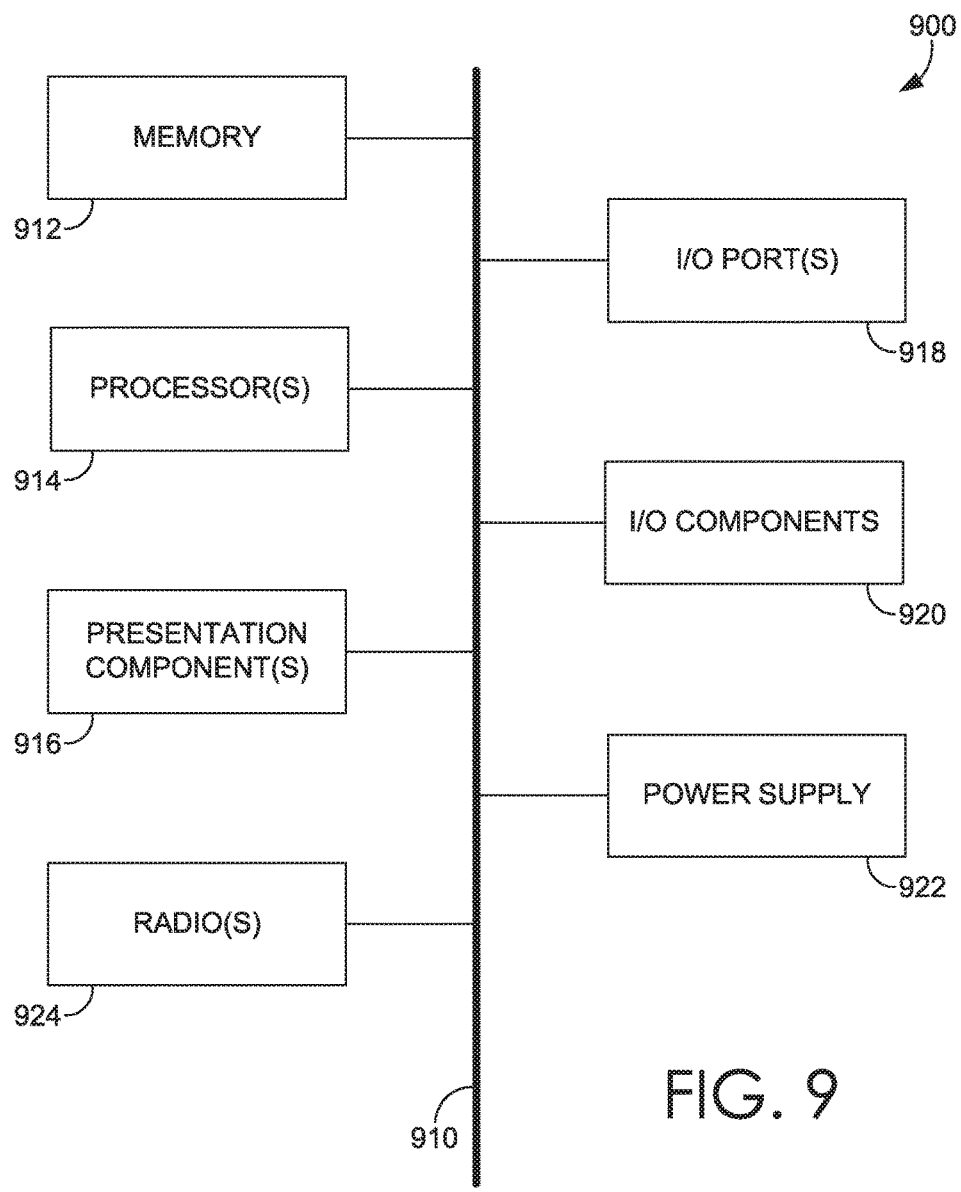

LARGE-SCALE IMAGE TAGGING USING IMAGE-TO-TOPIC EMBEDDING

BACKGROUND

Information searching utilizing the Internet is a widely growing practice among people young and old alike. Generally, a person wishing to gain knowledge about (or otherwise having an interest in) a particular topic or thing navigates to an online search engine and inputs a query into an appropriate query input field. A search then is initiated on the query and a selection of search results relevant to the input query is presented for inspection by and/or enjoyment of the user. With the widespread proliferation of such query-based search practices, methods and systems for locating and presenting relevant information in response to input queries have become increasingly important. For instance, search engines desiring to become users' go-to resource for conducting on-line searches are continually refining the systems and methods they utilize to determine the relevance of potential search results to an input search query.

Another growing trend in online information searching is the search for online images in addition to, or instead of, text-based documents. Two primary methods of image searching have become widely utilized. In a first method, a user inputs one or more textual keywords and images relevant to the keywords are presented in response. For instance, a user inputting the textual keyword "dog" may be presented with a plurality of images showing pictures of dogs upon conducting the keyword search. In a second method, images are utilized as the input query, for instance, when a user desires to view similar images and/or examine textual information regarding hat is depicted in the input image. By way of example, a user inputting an image of "Starry Night" by Vincent Van Gogh may be presented with images of other works by Vincent Van Gogh and/or text-based information about the artist, the painting, and the like upon execution of the image search.

Whether presenting images in response to a text-based query or an image-based query, determining the relevance of particular images with respect to the queried information can be an arduous task. In some instances, users may manually associate keywords with images included in an image database and/or keywords may be extracted from information obtained in conjunction with and/or in proximity to an image. Such keywords may then be associated with the image as a keyword tag. Subsequently, when a user is searching for images utilizing a keyword that is at least similar to a keyword tag associated with a given image, the given image may be presented in response to the query. Similarly, an input image having a keyword associated with it as a keyword tag, when searched, may prompt return of other images similarly having the keyword (or a similar keyword) associated therewith as a keyword tag. Tag-based methods and systems such as these, however, often present images only tangentially related to a given query, particularly in instances where the keyword tags associated with an image are varied due to multiple items being depicted in an image.

In other instances, search systems may extract visual characteristics from a given image and attempt to match such characteristics to similar visual characteristics of images in an image database for presentation to the user in response to a query. Visual-characteristic-based methods and systems such as these similarly can present images that are only tangentially related to a given query, for instance, due to the wealth of visual information that may be included in an image, only a portion of which may be related to the input query.

SUMMARY

Embodiments of the present invention relate to, among other things, a framework for associating images with topics that are indicative of the subject matter of the images utilizing embedding learning. The framework is trained utilizing multiple images, each image having associated visual characteristics and keyword tags. As to the visual characteristics, an image feature vector is generated from one or more visual features computed from the image. As to the tag information, the keyword tags are utilized to generate a weighted word vector for each image (that is, a word vector representing a concept dominant in the subject image as derived from the keyword tags). The weighted word vector and the image feature vector are aligned (i.e., made as close as possible to one another) in a common embedding space. Utilizing the aligned vectors, a relevancy score is computed (for instance, utilizing Euclidian distance calculations) for each of the keyword tags as it pertains to the subject image. Once trained, the framework described herein can be utilized to automatically associate keyword tags with additional input images and to rank the relevance of images with respect to queried keywords based upon associated relevancy scores.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein:

FIG. 9 is a block diagram of an exemplary computing environment suitable for use in accordance with some implementations of the present disclosure.

DETAILED DESCRIPTION

Figure 1:
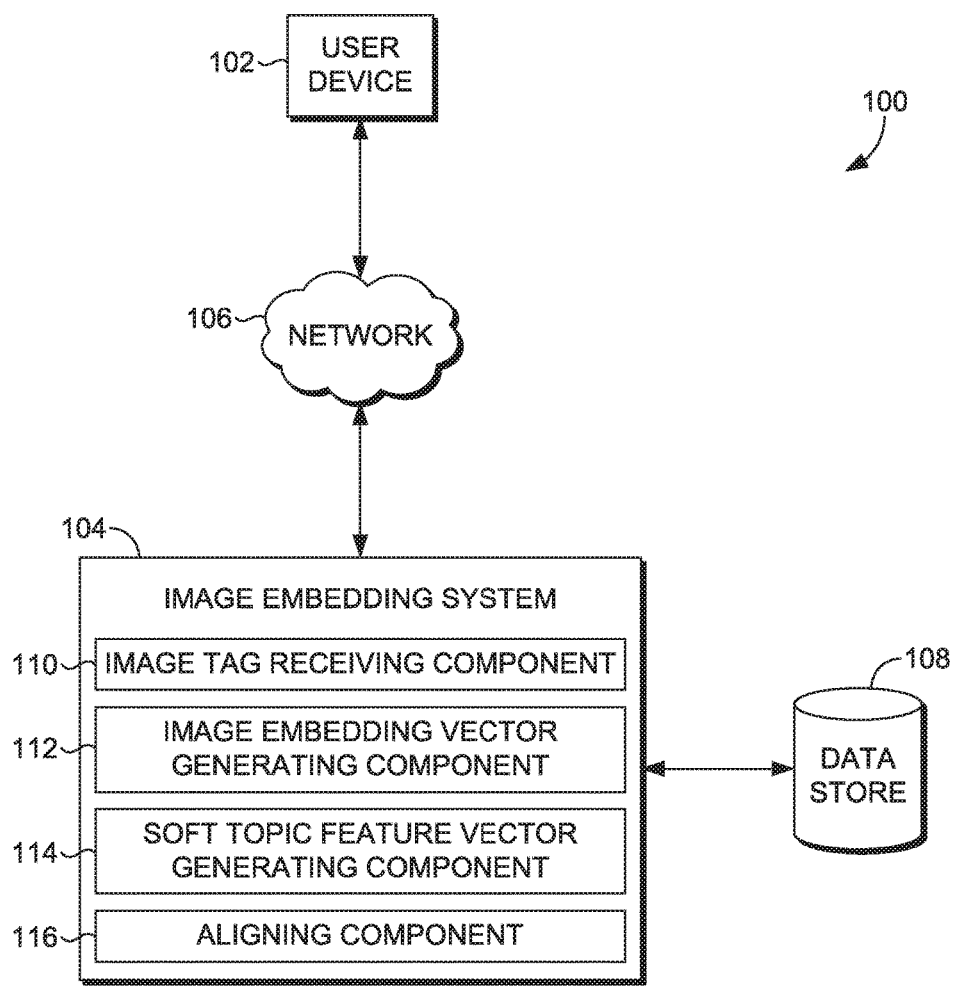
FIG. 1 is a block diagram illustrating an exemplary image-to-topic association and tagging system in accordance with some implementations of the present disclosure.

Embodiments of the present invention relate to, among other things, a framework for associating images with topics that are indicative of the subject matter of the images utilizing embedding learning. The framework is trained utilizing multiple images, each image having associated visual characteristics and keyword tags. As to the visual characteristics, an image feature vector is generated from one or more computed visual features. As to the tag information, the keyword tags are utilized to generate a weighted word vector or "soft topic feature vector" for each image (that is, a feature vector representing a dominant concept of the subject image derived from the keyword tags). The soft topic feature vector (weighted word vector) and the image feature vector are mapped to a common embedding space where the soft topic feature vector and the image feature vector are aligned (i.e., made as close as possible to one another). Utilizing the aligned vectors, a relevancy score is computed (for instance, utilizing Euclidian distance calculations) for each of the keyword tags as it pertains to the subject image, the relevancy score representing a degree of similarity between a particular tag and the embedded image feature vector. Once trained, the framework described herein can be utilized to automatically associate keyword tags with additional input images and to rank the relevance of images with respect to queried keywords based upon associated relevancy scores.

Traditional approaches to online image search are constrained in their ability to adequately identify and present the most relevant images available in response to an input query. Whether presenting images in response to a text-based query or an image-based query, refining the methods and systems for determining the relevance of particular images with respect to the queried information is an on-going undertaking for search engines and other entities that employ online search functionality. Metadata-keyword-tag-based methods and systems often present images only loosely related to a given query, particularly in instances where the keyword tags associated with an image are varied due to multiple items being depicted in an image. Similarly, visual-characteristic-based methods and systems can present images that are only loosely related to a given query, for instance, due to the wealth of visual information that may be included in an image, only a portion of which may be related to the input query.

Various embodiments of the present invention address the technical challenge of appropriately identifying and presenting the most relevant images available in response to an input search query by providing an approach that allows for associating images with topics that are indicative of the subject matter of the images utilizing embedding learning. During a training phase, multiple images are received, each image having associated visual characteristics and keyword tags. In some embodiments, the keyword tags are user-provided. As to the visual characteristics associated with the images, for each image, one or more visual features are computed and the visual features are utilized to create an image feature vector for each image. On the keyword side, during the training phase, the keyword tags are utilized to create an image-specific soft topic feature vector (or weighted word vector). More particularly, a word vector representation is generated for each keyword tag associated with an image and a weighted average of the generated word vector representations is calculated to generate a soft topic feature (or weighted word) vector for the image, i.e., a feature vector that is representative of a dominant concept among the keyword tags. The soft topic feature vector is normalized in an embedding space and the image feature vector is mapped to the embedding space where the normalized soft topic feature vector and the image feature vector are aligned (i.e., made as close as possible to one another, for instance, utilizing cosine similarity loss). Utilizing the aligned vectors, a relevancy score is computed for each of the keyword tags as it pertains to the subject image.

Once trained, the framework may automatically tag additional input images utilizing the systems and methods described herein and a text-based search engine may rank image relevance with respect to queried keywords based upon predicted relevancy scores. Similarly, and by way of reverse application, relevancy scores generated by the image auto-tagging system can be utilized to build a search engine for identifying images relevant to an input search query, be it a text-based or image-based query.

With reference now to the drawings, FIG. 1 is a block diagram illustrating an exemplary system 100 for image-to-topic association and tagging in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carded out by hardware, firmware, and/or software. For instance, various functions may be carried out by a processor executing instructions stored in memory.

The system 100 is an example of a suitable architecture for implementing certain aspects of the present disclosure. Among other components not shown, the system 100 includes a user device 102 interacting with an image embedding system 104 to associate images with topics indicative of the subject matter contained therein utilizing embedding learning. Each of the components shown in FIG. 1 can be provided on one or more computer devices, such as the computing device 900 of FIG. 9, discussed below. As shown in FIG. 1, the user device 102 and the image embedding system 104 can communicate via the network 106, which may include, without limitation, one or more local area networks (LANs) and/or wide area networks (WANs). Such networking environments are commonplace in offices, enterprise-wide computer networks, intranets, and the Internet. Accordingly, the network 106 is not further described herein. It should be understood that any number of user devices and image embedding systems may be employed within the system 100 within the scope of implementations of the present disclosure. Each may comprise a single device or multiple devices cooperating in a distributed environment. For instance, the image embedding system 104 could be provided by multiple server devices collectively providing the functionality of the image embedding system 104 as described herein. Additionally, other components not shown may also be included within the network environment.

The image embedding system 104 has access to a data store 108. In implementations of the present disclosure, the data store 108 is configured to be searchable for one or more of the items stored in association therewith. It should be understood that the information stored in association with the data store 108 may be configurable and may include any information relative to, by way of example only, images, keyword tags, soft topics, visual features, image vectors, and the like. The content and volume of such information are not intended to limit the scope of aspects of the present technology in any way. Further, the data store 108 may be a single, independent component (as shown) or a plurality of storage devices, for instance, a database cluster, portions of which may reside in association with the image embedding system 104, another external computing device shown), and/or any combination thereof. Additionally, the data store 108 may include a plurality of unrelated data stores within the scope of embodiments of the present technology.

The image embedding system 104 is generally configured to receive images from a user device, such as the user device 102, and associate such images with topics that are indicative of the subject matter contained therein utilizing embedding learning. The user device 102 can access and communicate with the image embedding system 104 via a web browser or other application running on the user device 102. The image embedding system 104 includes an image/tag receiving component 110 configured to receive a plurality of images for image-to-topic association and tagging. The image receiving component 110 is configured to receive images that include one or more visual characteristics and one or more keyword tags associated therewith (for instance, user-provided keyword tags) for purposes of training the image embedding system 104. The image receiving component 110 also is configured to receive images void of associated keyword tags, for instance, for purposes of associating keyword tags based upon comparison to other images and/or identifying similar images.

The image embedding system 104 also includes an image embedding vector generating component 112. The image embedding vector generating component 112 is configured to compute one or snore visual features from the visual characteristics of an image, generate a fixed-dimensional image feature vector from the one or more visual features, and generate an embedding vector from the image feature vector utilizing a convolutional neural network. Convolutional neural networks are known to those having ordinary skill in the relevant art and, accordingly, are not further described herein.

Further, the image embedding system 104 includes a soft topic feature vector (or weighted word vector) generating component 114. The soft topic feature vector generating component 114 is configured to generate a word vector representation for each of a plurality of keyword tags associated with an image, and calculate a weighted average of the generated word vector representations to generate a soft topic feature (or weighted word) vector. A soft topic feature vector represents a rough summary of the keyword tags associated with an image and exists in a continuous word vector space.

The image embedding system 104 also includes an aligning component 116. The aligning component 116 is configured to align (that is, render as close as possible to one another) an image feature vector and a soft topic feature vector to compute a relevancy score corresponding to each keyword tag associated with the image. The soft topic feature vector is image-specific.

Figure 2:
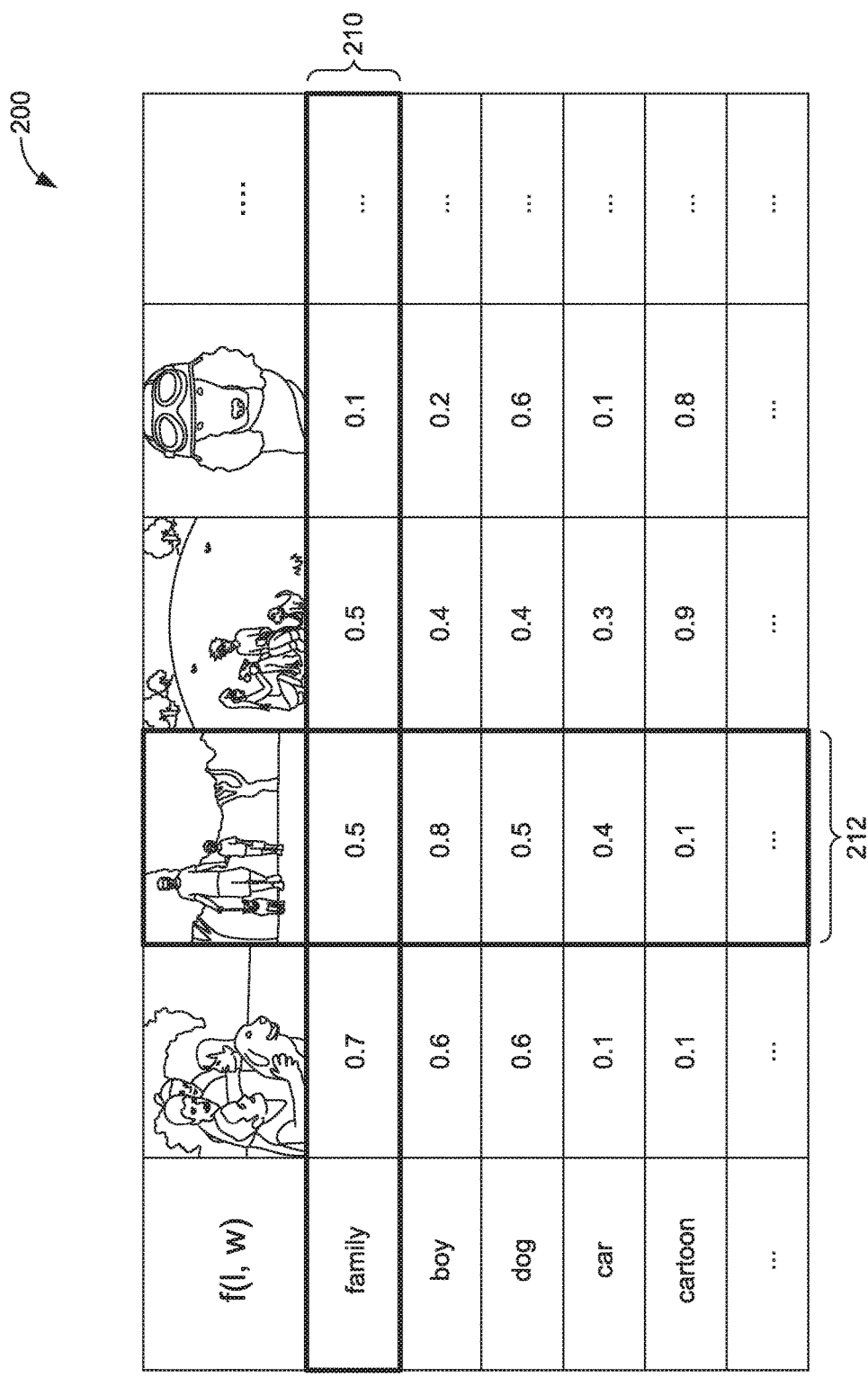
FIG. 2 is a schematic diagram illustrating an exemplary relationship between image tagging and text-based image search in accordance with some implementations of the present disclosure.

In accordance with implementations of the present disclosure, once the framework is trained, an auto-tagging functionality of the framework can be utilized to predict a list of keyword tags and associated relevancy scores for an input image. Similarly, and by way of reverse application, relevancy scores generated by the image auto-tagging system can be utilized to build a search engine for identifying images relevant to an input search query, be it a text-based or image-based query. The schematic diagram of FIG. 2 illustrates this relationship between image auto-tagging and text-based image search. The auto-tagging functionality in accordance with implementations of the present disclosure operates column-wise 212 to populate the relevancy score for each image and the text-based search system operates row-wise 210 to rank images based on the predicted relevancy scores. In embodiments, a scoring function $f: \mathbb{I} \times \mathbb{W} \rightarrow \mathbb{R}$ is learned, where $\mathbb{I}$ is the image space, $\mathbb{W}$ is the tag dictionary, and $f(I, w)$ quantifies the relevancy between image $I \in \mathbb{I}$ and tag $w \in \mathbb{W}$. After learning the scoring function $f$, for a given image $I \in \mathbb{I}$, the auto-tagging system utilizes $f(I, w)$ to keyword tags by sorting $w \in \mathbb{W}$. For a query text $w \in \mathbb{W}$, a text-based image search engine utilizes $f(I, w)$ to sort images $(I_1, I_2, \ldots I_n) \in \mathbb{I}$.

Figure 3:
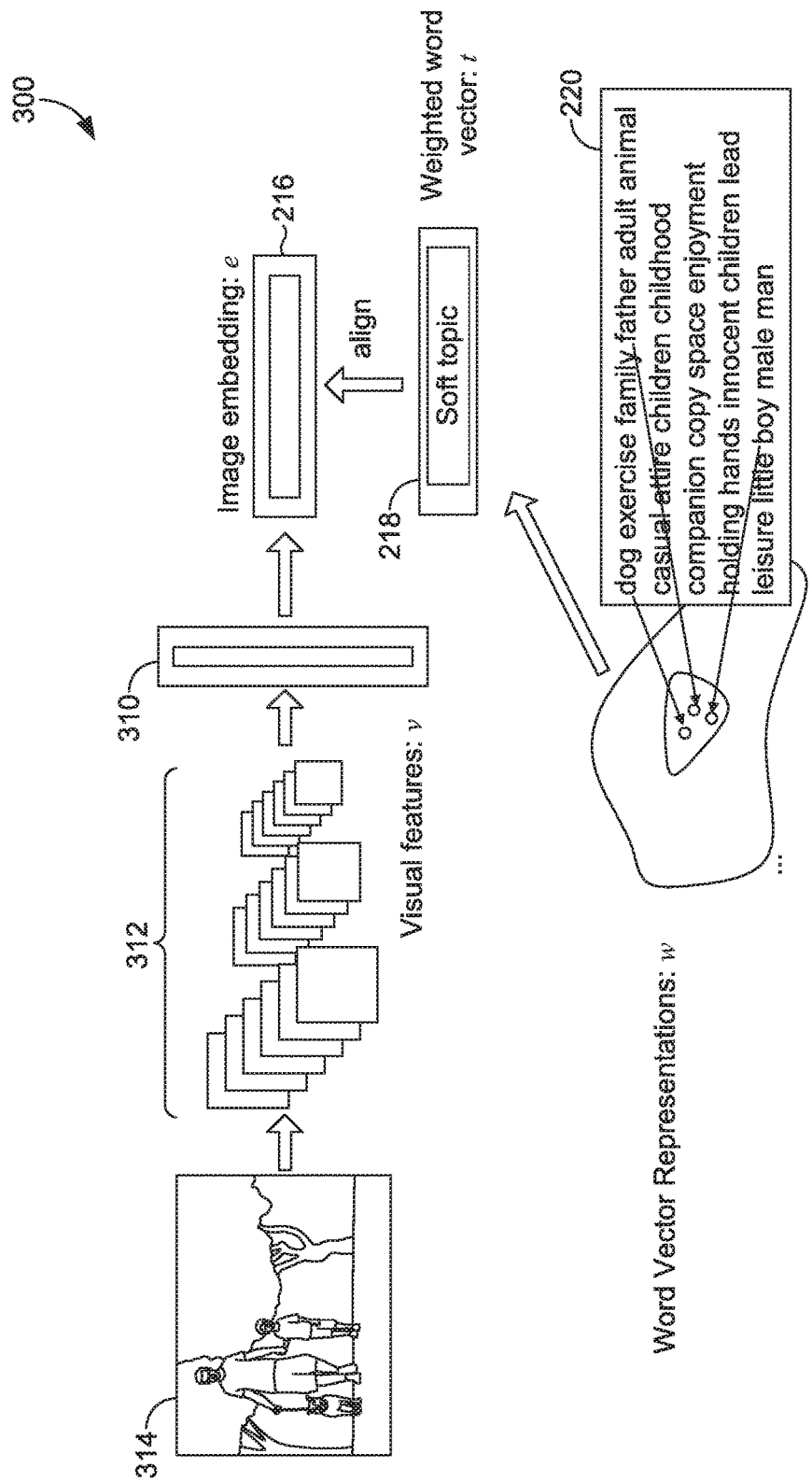
FIG. 3 is a schematic diagram illustrating an exemplary image-to-topic association and tagging system in accordance with some implementations of the present disclosure.

Implementations of the present disclosure utilize an image-to-topic embedding approach. A schematic diagram illustrating an exemplary overall embedding learning framework 300 in accordance with implementations of the present disclosure is shown in FIG. 3. The framework 300 is generally configured to create image feature vectors from visual features computed from images, create soft topic feature (weighted word) vectors from keyword tags associated with images, and to align the image feature vectors and the soft topic feature vectors in a common embedding space utilizing embedding learning. The training set is denoted as $\mathcal{D} = \{(I, (w_1, w_2, \ldots, w_n)\}$, where I is an image and $w_i$ is an associated keyword tag, for instance, provided by a user. To exploit tag correlation, a word vector representation is used for each $w_i$. An embedding network is learned to map the image feature vectors to an embedding space (formed by normalizing the soft topic feature vector, as more fully described below) as e=embed_net(I), where e $\in \varepsilon = \mathbb{R}^D$ with dimension $\mathcal{D}$. Then the similarity score between I and w can be directly measured in this space by:

$$f_{embed}(I, w) = \langle \text{embed\_net}(I), w \rangle \quad \text{(Equation 1)}$$
$$= \langle e, w \rangle$$
$$= \frac{e^T w}{\|e\| \|w\|},$$

for all $w \in \mathbb{W}$.

In accordance with implementations of the present disclosure, Pointwise Mutual Information (PMI) is utilized to represent tags $w \in \mathbb{W}$ as word vectors. As known to those having ordinary skill in the relevant art, PMI is a measure of association that is utilized in information theory and statistics. It is calculated as:

$$M = PMI(w_i, w_j) = \frac{\log p(w_i, w_j)}{\log p(w_i) \log p(w_j)} \quad \text{(Equation 2)}$$

Thus the matrix M is of size V×V, where V is size of tag dictionary $\mathbb{W}$ and M accounts for the co-occurrences of tags in the training corpus. Eigen vector decomposition is then applied to decompose the matrix M as $M=USU^T$. Let $W=US-\frac{1}{2}$, then each row of the column-truncated submatrix $W_{:,1:\mathcal{D}}$ is used as the word vector representation for all V tags. In accordance with exemplary implementations hereof, $\mathcal{D}$ is set to 4096. PMI is known to those having ordinary skill in the relevant art and, accordingly, is not further described herein.

After obtaining word vector representations for each tag, an encoding scheme for the set of user-provided tags ($w_1$, $w_2$, ..., $w_n$) associated with a given image is calculated. In accordance with exemplary implementations of the present disclosure, a soft topic t is generated as a weighted average of the set of word vectors. The following equation is utilized:

$$t = \sum_{i=1}^{n} \alpha_i w_i \qquad \text{(Equation 3)}$$

wherein t represents the soft topic feature vector, i=1 represents the subject image, $w_i$ represents the subject tag, n represents a quantity of tags, and $\alpha_i$ represents a weighting function.

This encoding scheme is referred to herein as a "soft topic." A soft topic is a coarse summary of the user-provided tags and it lives in a continuous word vector space (as opposed to the hard assignment of a hard topic, more fully explained below. Soft topics generated in accordance with implementations hereof permit discovery of one or more dominant concepts in the set of keyword tags, enabling the system to be robust to "noisy" annotations, that is, annotations having limited useful information with respect to an image.

Several choices of weighting function $\alpha_i$ may be utilized in accordance with implementations of the present disclosure. By way of example only, $\alpha_i$ may be calculated uniformly, providing all keyword tags with an equal weight. By way of another example, $\alpha_i$ may be calculated utilizing tag order. Tag order assumes that tags provided by a user are provided in a time-order having some correlation to their relevance to the image. Thus, a first keyword tag is assigned a greater weight than a second tag when the first tag is provided before the second tag. By way of yet another example, $\alpha_i$ may be calculated utilizing Inverse Document Frequency (IDF). With IDF, the more frequently a particular tag is associated with any image in a dataset of images, the less weight it is afforded. However, the rarer a metadata keyword is, the higher weight it is afforded. It will be understood and appreciated by those having ordinary skill in the art that the weighting schemes described herein are offered by way of example only. Any number of weighting schemes may be utilized in accordance with implementations of the present disclosure. Any and all such variations, and any combination thereof, are contemplated to be within the scope of embodiments of the present invention.

Figure 4:
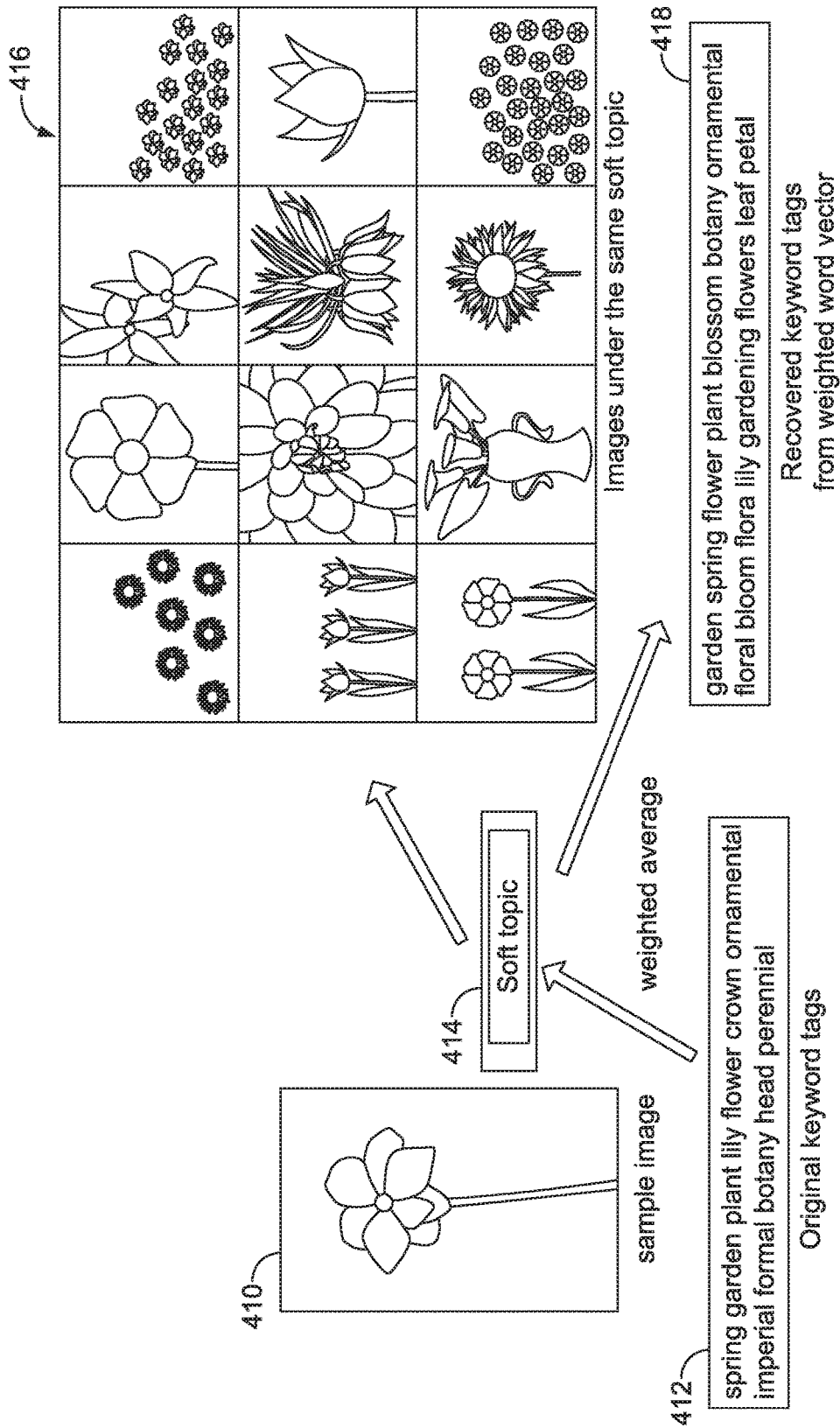
FIG. 4 is a schematic diagram illustrating exemplary search results returned for an input image utilizing an image-to-topic embedding system in accordance with some implementations of the present disclosure.

Representative search results generated from an exemplary soft topic is illustrated in the schematic diagram of FIG. 4. For the sample image 410 and the original keyword tags 412, a soft topic feature vector 414 is formed by Equation 3. The soft topic feature vector 414 then is used to retrieve images 416 in the dataset with similar soft topic feature vectors. It can be seen that the retrieved images 416 are all under the topic "garden/flower" and the recovered keyword tags 418 from the soft topic feature vector 414 are similar, and in some instances identical, to the original keyword tags 412.

In addition to keyword tags, images in the dataset include a plurality of visual characteristics as well. In accordance with implementations of the present invention, visual features are computed from the visual characteristics. Visual features may include, by way of example only, lower level features such as lines, curves, etc., and/or higher level features such as shapes, body parts (human or otherwise), and the like. In implementations, the visual features are computed utilizing a convolutional neural network, a deep network functionality known to those having ordinary skill in the relevant art. From the visual features, an N-dimensional image feature vector (i.e., a fixed-dimensional feature vector where N=a positive integer) generated from the one or more visual features.

Figure 5:
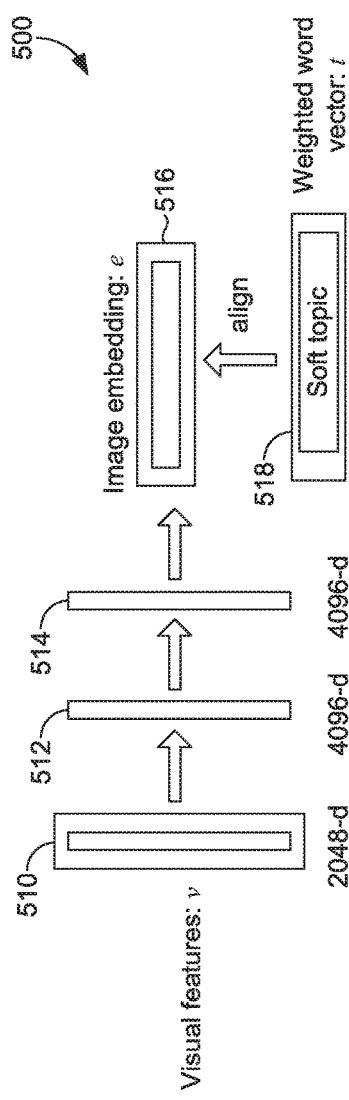
FIG. 5 is a schematic diagram illustrating an exemplary embedding network for embedding learning utilizing soft topics in accordance with some implementations of the present disclosure.

A convolutional neural network then is employed to map the image feature vector and the soft topic feature vector into a common embedding space ε. More specifically, each image I is passed through a residual network and the penultimate layer is extracted and used as image feature vector v. An exemplary embedding network 500 is shown in FIG. 5. The illustrated embedding network 500 is a three-layer 510, 512, 514 fully-connected convolutional neural network with each fully-connected layer followed by a batch normalization layer and ReLU non-linear activation layer. Convolutional neural networks and the illustrated layers and their functionality are known to those having ordinary skill in the relevant art and, accordingly, are not further described herein.

The image embedding e 516 and the soft topic feature vector t 518 are aligned, for instance, with a cosine similarity loss:

$$\text{embed\_loss}(e, t) = 1 - \langle e, t \rangle \qquad \text{(Equation 4)}$$
$$= 1 - \frac{e^T t}{\|e\|\|t\|}$$

Discriminative Feature Training with Hard Topic

As mentioned above, for each image I an image feature vector $v \in \mathbb{R}^D$ is utilized as an image representation. In accordance with exemplary implementations of the present disclosure, a separate feature learning step is used to train discriminative visual features.

Figure 6:
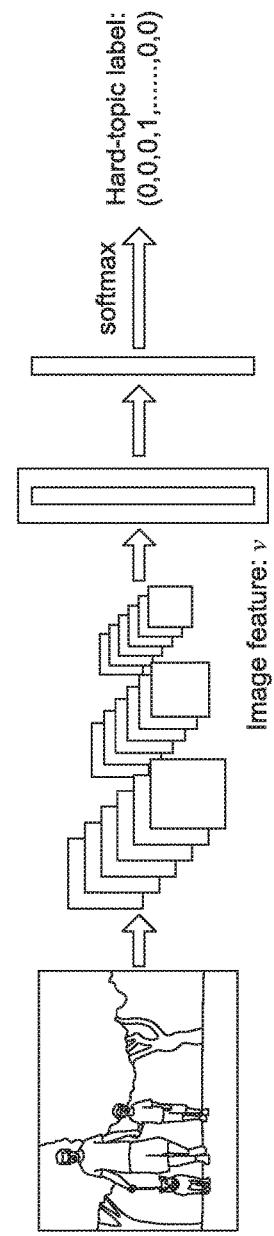
FIG. 6 is a schematic diagram illustrating an exemplary method for feature training with hard topics in accordance with some implementations of the present disclosure.
Figure 7:
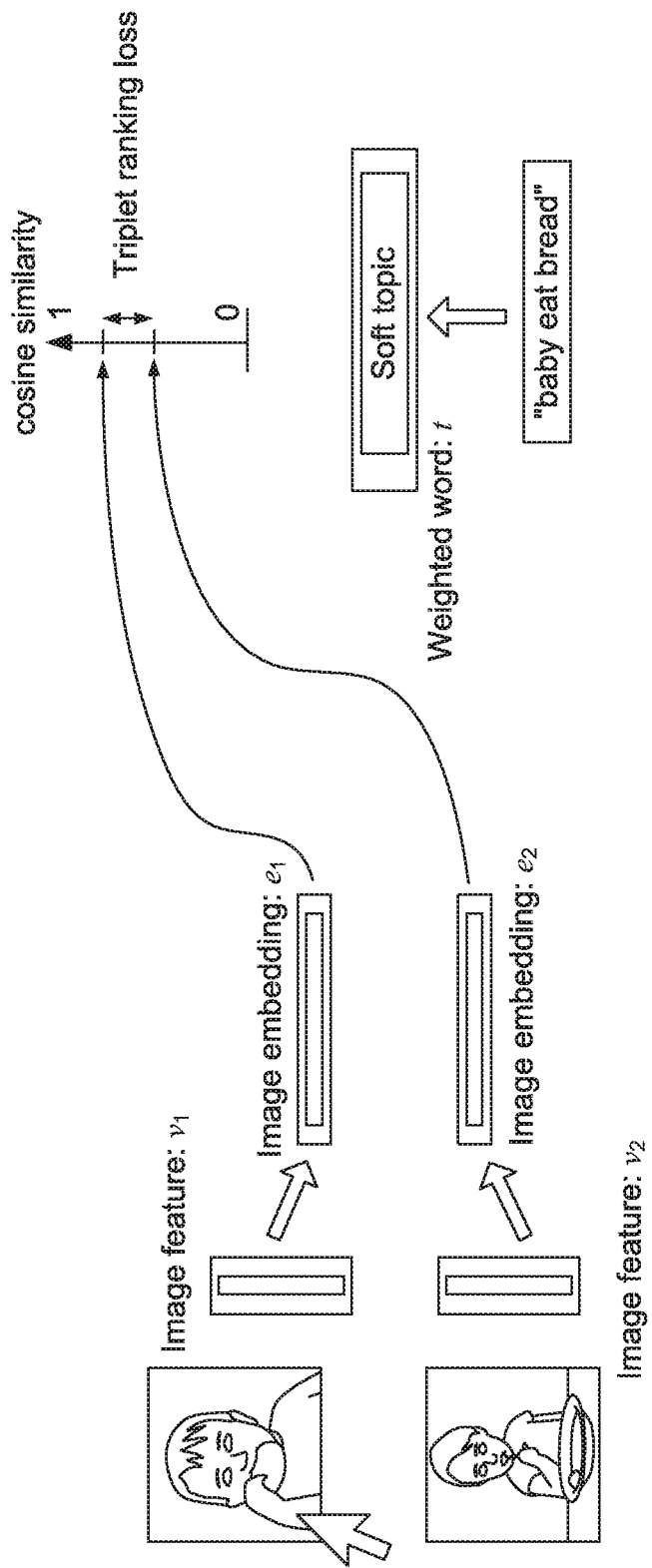
FIG. 7 is a schematic diagram illustrating an exemplary method for image search ranking optimization utilizing image-to-query embedding in accordance with some implementations of the present disclosure.

First, the soft topics for a subset of the training images are clustered by K-Means Clustering (a vector quantization method known to those having ordinary skill in the relevant art) to form K cluster centers. Each soft topic is assigned to one of the cluster centers by hard assignment. The hard assignment is referred to herein as a "hard topic." In accordance with implementations hereof, and as illustrated in the schematic diagram of FIG. 6, a residual network is employed with a softmax layer to predict the hard topic assignment for each image.

An alternative for feature learning as disclosed herein is end-to-end fine-tuning of the convolutional neural network together with the embedding network. Although the disclosed auto-tagging performance is similar to feature learning with hard topics, soft-topic features and hard-topic features have distinct properties. For instance, features learned utilizing soft topics tend to be more semantically similar to input query images while features learned utilizing hard topics tend to be more visually similar to the input query images. Thus, implementations of the present disclosure combine weighted soft topic embedding with hard topic feature learning to achieve a more robust and accurate framework.

Image Search Ranking Optimization by Image-to-Query Embedding in addition to user-provided keyword tags, another source of training supervision utilized in accordance with implementations of the present disclosure is click-through data mined, for instance, from server logs. Each entry in the click-through log is a tuple given as:

click_entry=(query phrase $q$, clicked image $I_p$, unclicked image $I_n$) (Equation 5)

The goal is to optimize the image-to-query embedding, so that the clicked image is ranked higher by $f_{embed}(I, q)$. This can be achieved by fine-tuning the embedding network with a triplet ranking loss, for instance, as illustrated in the schematic diagram of FIG. 6. Further, to preserve the absolute relevancy score, a technique referred to herein as "positive enhancement" is utilized to regularize the learning.

For a click entry in the training click log given in the form of Equation 5, the query phrase is encoded as a soft topic vector $t_q$ and image feature $v_p$ and $v_n$, is extracted from $I_p$ and $I_n$. Then the network is fine-tuned with the triplet ranking loss:

triplet_rank_loss($t_q$, $v_p$, $v_n$)=max(0, $f_{embed}(v_p, t_q)$−$f_{embed}(v_n, t_q)$+C), (Equation 6)

Where $v_p$ is the image feature vector for clicked image $I_p$, $v_n$ is the image feature vector for un-clicked image $I_n$, $f_{embed}(v_p, t_q)$ is the scoring function given in Equation 1 and C is the margin.

Intuitively, the triplet ranking loss tries to optimize the network so that the $v_p$ is closer to the query $t_q$ than $v_n$, up to a margin C.

Positive Enhancement

One problem with the above ranking loss is that it only penalizes the relative difference between positive and negative images while the absolute relevancy score might be low even for positive images. To alleviate this effect, a technique referred to herein as "positive enhancement" is utilized to enforce high relevancy score for positive (i.e., user-selected) images. In particular, a modified back-propagation procedure (a procedure known to those having ordinary skill in the relevant arts is utilized so that the positive branch has a higher learning rate than the negative branch:

$$\delta v_p = \kappa \frac{\partial \text{triplet\_rank\_loss}}{\partial v_p}$$

$$\delta v_n = (1-\kappa) \frac{\partial \text{triplet\_rank\_loss}}{\partial v_n}$$

(Equation 7)

where $\kappa > 0.5$.

With positive enhancement, positive images have a higher similarity score than the negative images. At the same time, the absolute similarity value is retained.

Soft-Topic Embedding as a Voting Module for K-NN

K-Nearest Neighbor (K-NN) is a strong baseline for image tagging. By maintaining a large image database, the predicted tags tend to be more specific and diverse. However previous approaches transfer all the tags of the neighboring images without analyzing the visual content of the query image. To address this problem, in accordance with implementations of the present disclosure, the image-tag relevancy score generated by soft-topic embedding can be used as a query-specific voting module in the K-NN system. This can be viewed as a combination of K-NN and embedding so that the advantage of both approaches is combined.

A baseline K-NN system works as follows (a relatively large image database is maintained):

$$\mathcal{D} = \{(v_i, W_i)\}$$
$$= \{(v_i, \{w_1, w_2, \ldots, w_n\})\}.$$

(Equation 8)

When a new image feature $v_q$ is received, the K nearest $$\{(v_k, W_k)\}_{k=1}^{K},$$

images are retrieved by measuring feature similarity. Then a tag transfer process is used to predict the tag relevancy score for the query image:

$$f_{knn}(v_q, w) = \frac{\sum_{k=1}^{K} 1_{w \in W_k}}{K}$$

(Equation 9)

Essentially, this counts the frequency of a tag appearing in the neighboring images. However, the transfer process can mistakenly transfer non-relevant tags from the neighboring images.

In accordance with implementations of the present disclosure, the embedding scoring function $f_{embed}$ is employed as a voting module for a K-NN system.

$$f_{knn}(v_q, w) = \frac{\sum_{k=1}^{K} f_{embed}(v_q, w) \cdot 1_{w \in W_k}}{K}$$

(Equation 10)

The voting module works by generating a query-dependent score for the keyword tags of each neighboring image. Hence, the tag transfer process in K-NN provides greater weight to keyword tags having greater visual evidence.

Figure 8:
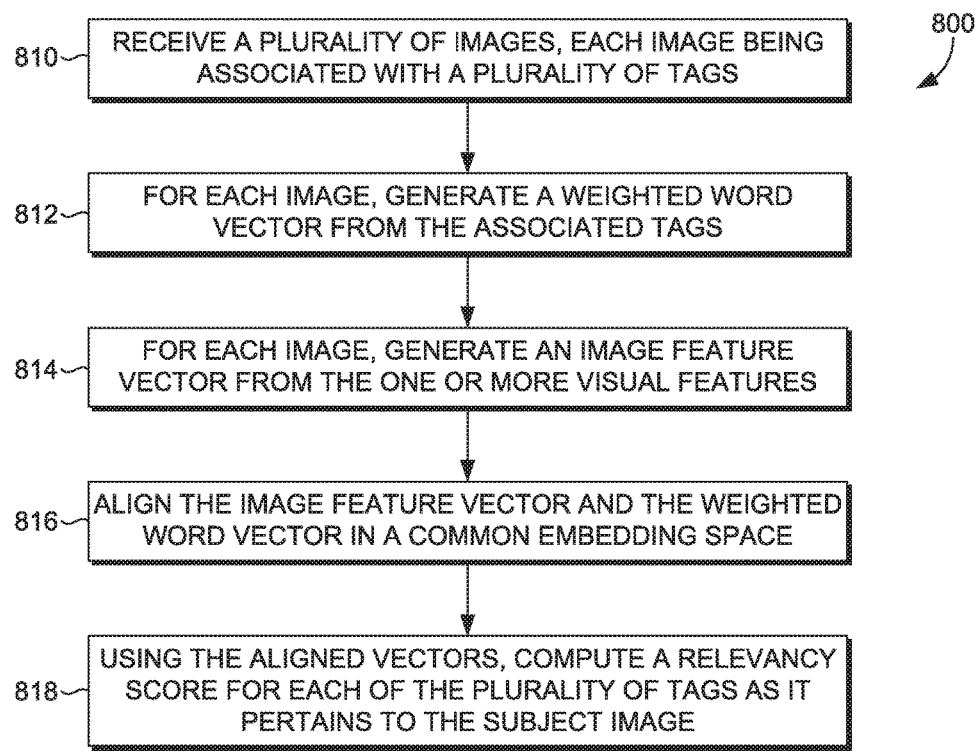
FIG. 8 is a flow diagram illustrating an exemplary method for image-to-topic association and tagging in accordance with some implementations of the present disclosure.

Turning now to FIG. 8, a flow diagram is shown illustrating an exemplary method 800 for image-to-topic embedding in accordance with implementations of the present disclosure. Each block of the method 800 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

As shown at block 810, a plurality of images is received, each image being associated with a plurality of visual characteristics and a plurality of keyword tags. For each image, a weighted word vector (or soft topic feature vector) is generated from the associated keyword tags, as shown at block 812. In this regard, a word vector representation is generated for each of the plurality of keyword tags. In implementations, the word vector representation is generated utilizing Pointwise Mutual Information (PMI). In implementations, PMI is utilized to generate the word vector representation in accordance with Equation 2, set forth above. A weighted average of the generated word vector representations is calculated to generate a weighted word vector (or soft topic feature vector). As previously set forth, a soft topic feature vector represents a coarse summary of the plurality of keyword tags and, as such, identifies a dominant concept contained in the tags. In implementations, the weighted average is calculated utilizing Equation 3, set forth above. In accordance with exemplary implementations of the present disclosure, the weighted average is calculated utilizing one or more of tag order and inverse document frequency (IDF). The soft topic feature vector is normalized in an embedding space.

For each image of the plurality of images, one or more visual features are computed. Visual features may include, by way of example only, lower level features such as lines, curves, etc., and/or higher level features such as shapes, body parts (human or otherwise), and the like. In implementations of the present disclosure, the visual features are computed utilizing a convolutional neural network, a deep network functionality known to those having ordinary skill in the relevant art. As shown at block 814, an N-dimensional image feature vector (i.e., a fixed-dimensional feature vector where N=a positive integer) is generated from the one or more visual features.

The N-dimensional image feature vector and the weighted word vector are aligned in a common embedding space such that they are similar to one another, as shown at block 816. In implementations, the N-dimensional image feature vector and the soft topic feature vector are aligned utilizing cosine similarity loss in accordance with Equation 4, set forth above.

As shown at block 818, using the aligned vectors, a relevancy score is computed for each of the plurality of keyword tags as it pertains to the subject image. In accordance with exemplary implementations of the present disclosure, the relevancy score is computed utilizing Equation 1, as set forth above. The relevancy score then can be utilized for one or more of auto-tagging image with the keyword tags and ranking images relative to one another based upon the relevancy of the keyword tags associated therewith in a text-based search engine.

Having described implementations of the present disclosure, an exemplary operating environment in which embodiments of the present invention may be implemented is described below in order to provide a general context for various aspects of the present disclosure. Referring to FIG. 9, an exemplary operating environment for implementing embodiments of the present invention is shown and designated generally as computing device 900. Computing device 900 is but one example of a suitable computing environment and is not intended to suggest any limitation as to the scope of use or functionality of the invention. Neither should the computing device 900 be interpreted as having any dependency or requirement relating to any one or combination of components illustrated.

The invention may be described in the general context of computer code or machine-usable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

Computing device 900 includes bus 910 that directly or indirectly couples the following devices: memory 912, one or more processors 914, one or more presentation components 916, input/output (I/O) ports 918, input/output components 920, and illustrative power supply 922. Bus 910 represents what may be one or more busses (such as an address bus, data bus, or combination thereof). Although the various blocks of FIG. 9 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 9 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 9 and reference to "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 900. Computer storage media does not comprise signals per se. Communication media typically embodies computer-readable instructions, data structure program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 912 includes computer storage media in the form of volatile and/or nonvolatile memory. The memory may be removable, non-removable, or a combination thereof. Exemplary hardware devices include solid-state memory, hard drives, optical-disc drives, etc. Computing device 900 includes one or more processors that read data from various entities such as memory 912 or I/O components 920. Presentation component(s) 916 present data indications to a user or other device. Exemplary presentation components include a display device, speaker, printing component, vibrating component, etc.

I/O ports 918 allow computing device 900 to be logically coupled to other devices including I/O components 920, some of which may be built in. Illustrative components include a microphone, joystick, game pad, satellite dish, scanner, printer, wireless device, etc. The I/O components 920 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 900. The computing device 900 may be equipped with depth cameras, such as, stereoscopic camera systems, infrared camera systems, RGB camera systems, and combinations of these for gesture detection and recognition. Additionally, the computing device 900 may be equipped with accelerometers or gyroscopes that enable detection of motion.

As described above, implementations of the present disclosure relate to a framework for image-to-topic embedding. The framework is trained utilizing a plurality of images, each image having a plurality of visual characteristics and a plurality of keyword tags associated therewith. Visual features are computed from the visual characteristics utilizing a convolutional neural network and an image feature vector is generated from the visual features. The keyword tags are utilized to generate a soft topic feature vector for each image by calculating a weighted average of the generated word vector representations, each word vector representation being generated for a different one of the plurality of tags associated with the image. The image feature vector and the soft topic feature vector are aligned and a relevancy score is computed for each of the plurality of keyword tags as it pertains to the subject image. Once trained, the framework may automatically tag additional input images utilizing the systems and methods described herein and a text-based search engine may rank image relevance with respect to queried keywords based upon predicted relevancy scores.

The subject matter of the present invention has been described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

What is claimed is:

1. A computer system comprising:
   one or more processors; and
   one or more computer storage media storing computer-useable instructions that, when used by the one or more processors, cause the one or more processors to:
   receive a plurality of images, each image of the plurality of images being associated with a plurality of tags; and
   for each subject image of the plurality of images:
   generate a word vector representation for each of the associated plurality of tags;
   calculate a weighted average of the generated word vector representations to generate a weighted word vector, the weighted average being calculated, at least in part, utilizing inverse document frequency;
   normalize the weighted word vector in a common embedding space;
   generate an image feature vector from one or more visual features associated with the subject image;
   align the image feature vector and the weighted word vector in the common embedding space; and
   using the aligned vectors, compute a relevancy score for each of the associated plurality of tags as it pertains to the subject image.

2. The computing system of claim 1, wherein for each image of the plurality of images, the one or more processors are further caused to compute the one or more visual features.

3. The computing system of claim 2, wherein the one or more visual features are computed utilizing a convolutional neural network.

4. The computing system of claim 1, wherein the word vector representation for each of the associated plurality of tags is generated utilizing Pointwise Mutual Information.

5. The computing system of claim 1, wherein each of the associated plurality of tags is a user-provided tag, and wherein the weighted average is calculated, at least in part, utilizing a tag order in which a first tag of the plurality of associated tags is assigned a greater weight than a second tag of the plurality of associated tags when the first tag is provided by the user before the second tag.

6. The computing system of claim 1, wherein the relevancy score for each of the plurality of tags represents a degree of similarity between a particular tag of the plurality of tags and the image feature vector.

7. The computing system of claim 1, wherein the weighted word vector and the image feature vector are aligned utilizing cosine similarity loss.

8. The computing system of claim 1, wherein the one or more processors are further caused to:
   cluster the weighted word vectors for at least one subset of the plurality of images by K-means clustering to form K clusters, each cluster representing a set of topics that are more semantically similar to one another than to others of the K clusters; and
   assign each of the weighted word vectors for the at least one subset to one of the K clusters utilizing, at least in part, a softmax loss function, wherein K=a positive integer.

9. The computing system of claim 1, wherein the one or more processors are further caused to alter the relevancy score for at least a portion of the plurality of tags utilizing click-thru data pertaining to the associated image and a query.

10. The computing system of claim 1, further comprising:
receiving a query image;
generating an image feature vector for the query image; and
generating a query-dependent relevancy score for at least one tag associated with a nearest-neighbor image of the query image.

11. A computer-implemented method for tagging images, the method receiving an image associated with a plurality of user-provided tags;
generating a word vector representation for each of the plurality of user-provided tags;
calculating a weighted average of the generated word vector representations to generate an image-specific weighted word vector, the weighted average being calculated, at least in part, utilizing a tag order in which a first tag of the plurality of associated tags is assigned a greater weight than a second tag of the plurality of associated tags when the first tag is provided by the user before the second tag;
normalize the image-specific weighted word vector in an embedding space; and
computing a relevancy score for each of the plurality of tags as it relates to the image.

12. The method of claim 11, wherein the word vector representation for each of the associated plurality of user-provided tags is generated utilizing Pointwise Mutual Information.

13. The method of claim 11, wherein the weighted average is calculated, at least in part, utilizing inverse document frequency.

14. The method of claim 11, further comprising, for each image of the plurality of images:
computing one or more visual features;
generating an image feature vector from the one or more visual features;
map the fixed-dimensional image feature vector to the embedding space; and
align the weighted word vector arid the image feature vector in the embedding space utilizing cosine similarity loss.

15. The computing system of claim 14, wherein computing a relevancy score for each of the plurality of tags as it relates to the image comprises computing a relevancy score for each of the plurality of tags that represents a degree of similarity between a particular tag of the plurality of tags and the image feature vector.

16. A computing system comprising:
one or more processors; and
one or more computer storage media storing computer-useable instructions that, when used by the one or more processors, cause the one or more processors to:
generate an image feature vector from a plurality of visual features computed from an image utilizing a convolutional neural network;
generate a word vector representation for each of the associated plurality of tags utilizing Pointwise Mutual Information;
calculate a weighted average of the generated word vector representations to generate a weighted word vector for the image by calculating a weighted average of a plurality of word vector representations, each of the plurality of word vector representations being generated for a different one of a plurality of tags associated with the image;
normalize the weighted word vector in a common embedding space; and
align the weighted word vector and the image feature vector in the common embedding space.

17. The computing system of claim 16, wherein the computer-useable instructions further cause the one or more processors to calculate a relevancy score for each of the plurality of tags as it pertains to the image.

* * * * *

UNITED STATES PATENT AND TRADEMARK OFFICE
CERTIFICATE OF CORRECTION

PATENT NO. : 10,216,766 B2
APPLICATION NO. : 15/463769
DATED : February 26, 2019
INVENTOR(S) : Zhe Lin et al.

Page 1 of 1

It is certified that error appears in the above-identified patent and that said Letters Patent is hereby corrected as shown below:

In the Specification

Column 01, Line 34: Please remove "hat" and replace with --what--.
Column 05, Line 39: Please remove "snore" and replace with --more--.
Column 07, Line 26: Please remove "below." and replace with --below).--.
Column 08, Line 10: Please remove "integer)" and replace with --is--.
Column 09, Line 42: Please remove "arts" and replace with --art)--.

Signed and Sealed this
Fourteenth Day of April, 2020

Andrei Iancu
*Director of the United States Patent and Trademark Office*